Nov. 21, 1939. E. J. POOL 2,180,919
SOLDERING LUG AND SOLDERING LUG INSTALLATION
Filed Jan. 7, 1938 2 Sheets-Sheet 1

Inventor:
Esson J. Pool.
by Walter J. Jones
Att'y.

Nov. 21, 1939.        E. J. POOL        2,180,919
SOLDERING LUG AND SOLDERING LUG INSTALLATION
Filed Jan. 7, 1938        2 Sheets-Sheet 2
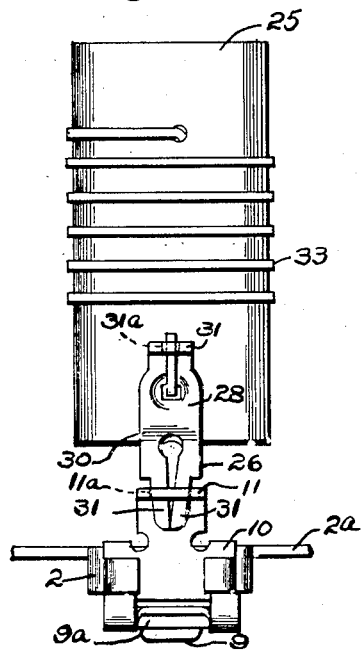
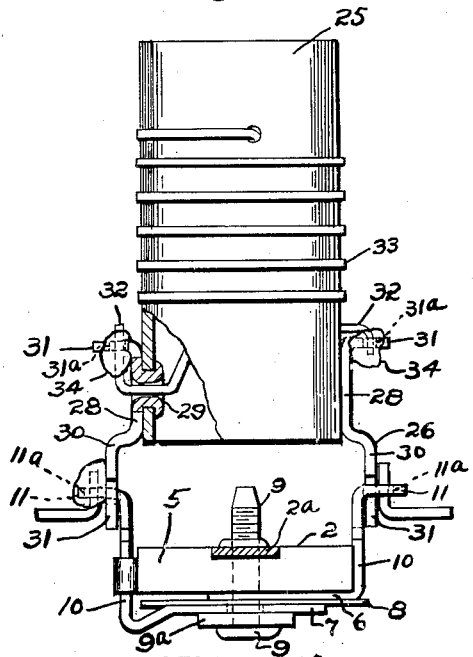
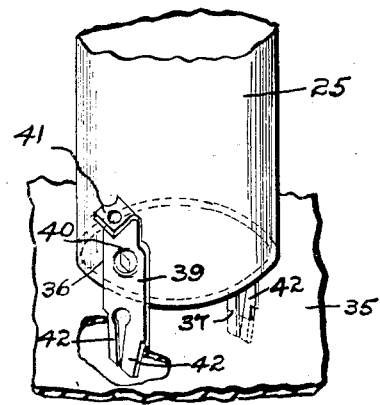
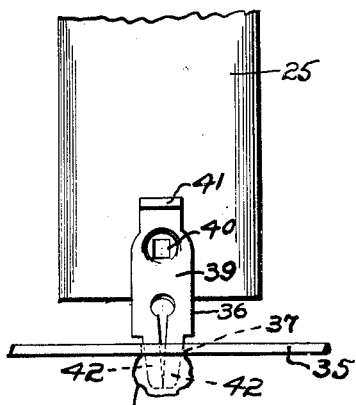
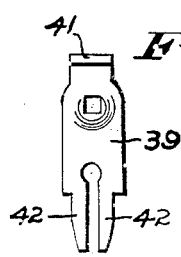
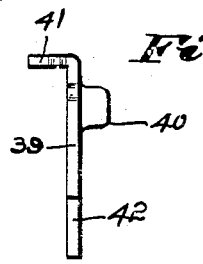
Inventor:
Esson J. Pool.
by Walter S. Jones Att'y.

Patented Nov. 21, 1939

2,180,919

UNITED STATES PATENT OFFICE 2,180,919

SOLDERING LUG AND SOLDERING LUG INSTALLATION

Esson J. Pool, Elmhurst, Ill., assignor to Cinch Manufacturing Corporation, Chicago, Ill., a corporation of Illinois Application January 7, 1938, Serial No. 183,885

4 Claims. (Cl. 113—111)

This invention relates to soldering lugs for securing parts, such as radio frequency coils, to a supporting means, which may be any suitable part of radio apparatus.

Referring to the drawings, in which I have illustrated preferred embodiments of my invention:

Fig. 7 is a plan view showing a tuning coil secured to a trimmer condenser by means of my second form of soldering lug;

Fig. 8 is a side view of the installation shown in Fig. 7 with a portion of the tuning coil cut away;

Fig. 9 is a perspective view showing the manner in which a coil form may be secured to an insulating plate by means of my second form of soldering lug;

Fig. 10 is a front elevation of the installation shown in Fig. 9;

Fig. 11 is a front view of my second form of soldering lug per se; and

Fig. 12 is a side view of the soldering lug shown in Fig. 11.

The chief object of my invention is to provide a soldering lug which is constructed in such a way that it is useful to secure temporarily an electrical unit, such as a coil form, to a supporting part whereby the unit is assembled with the supporting part prior to being permanently soldered thereto. Thus my invention, through overcoming certain difficulties in handling during assembly, is particularly useful in high speed assembly of the type carried on by modern manufacturers of radios and other apparatus. My improved soldering lugs are further useful in providing means whereby a lead wire, or plurality of wires, may be efficiently secured thereto.

Figure 1:
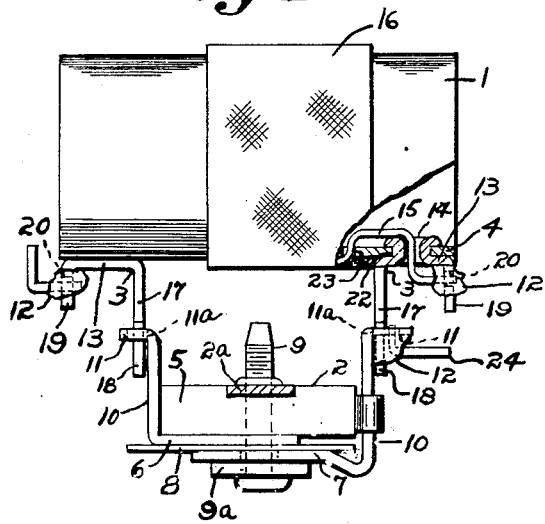
Figure 1 is a plan view of a tuning coil secured to a trimmer condenser by means of one form of my improved soldering lugs with a portion of the coil form cut away to show the manner in which a lug is secured to the coil.
Figure 2:
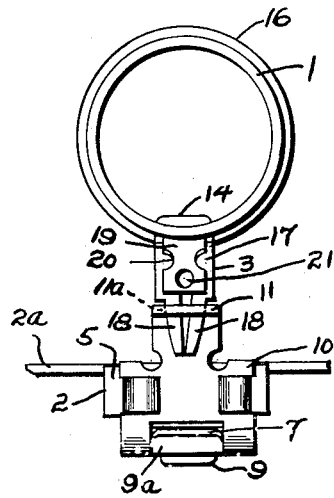
Fig. 2 is an end view of the installation shown in Fig. 1 with the lead wires omitted.

Referring to Figs. 1 and 2 of the drawings, I have shown a part of electrical apparatus, such as a tuning coil 1, secured to a supporting part, such as a trimmer condenser 2, by means of a pair of my first form of soldering lugs 3, which are riveted to the cylindrical cardboard form 4 of the tuning coil and provide yieldable means in fastening engagement with suitable cooperating parts of the trimmer condenser 2. The trimmer condenser 2 is of a type well known in the trade having a body portion 5, which may be of porcelain or other suitable insulating material, and a pair of metal plates 6 and 7 secured to the body portion. An insulating means, such as a mica dielectric 8, is disposed between the plates. A screw 9, insulated from the plates 6 and 7 by the dielectric washer 9ª, extends through the plates and the insulating body 5 and is adapted for tuning regulation in a manner well known in the art. The screw 9 also serves as a means for securing the trimmer condenser to a suitable supporting frame of the radio apparatus such as the bar 2ª. Each of the plates 6 and 7 has a right-angular bend portion 10 disposed on opposite sides of the body portion 5 and an outwardly-flared portion 11 provided at the free end thereof. Attention is called to the fact that in the use of my first form of lug the coil form 1 is disposed so that its major axis is substantially parallel to the lateral plane of the flared portions 11. Each of the outwardly-flared portions 11 has an opening 11ª therein for receiving the yieldable attaching means of the soldering lugs whereby the lugs may be temporarily engaged with the portions 11 until solder, as shown at 12 in Fig. 1, is applied to the point of engagement of the yieldable means of the soldering lugs and the outwardly-flared portions 11 for permanently securing the lugs thereto. This yieldable means acts as a friction to hold the parts in assembly during handling and until the solder is applied.

Figure 5:
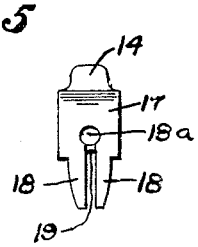
Fig. 5 is a front view of the soldering lug shown in Fig. 4.
Figure 6:
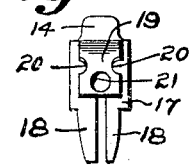
Fig. 6 is a rear view of the soldering lug shown in Figs. 4 and 5.

Referring in detail to my first form of soldering lug 3, I have provided a one-piece lug comprising a relatively flat portion 13 having a rivet 14, in my preferred form, pressed therefrom for securing the soldering lug to the cardboard form 4 of the tuning coil. The rivet 14 is preferably of tubular form so as to enable a lead wire 15, which may be one end of a coil winding 16, to be passed through the rivet 14 after attachment and permanently secured to a wire-receiving portion of the lug by solder 12, as most clearly shown in Fig. 1. An attaching means in the form of a right-angular bend 17 extends from one end of the flat portion 13 and is bifurcated at its free end providing a pair of yieldable fingers 18—18 adapted to extend through a supporting part which, in the installation shown in Figs. 1 and 2, is the outwardly-flared portions 11 of the trimmer plates 6 and 7. The outer edges of the yieldable portions 18—18 converge toward their free ends, as most clearly shown in Figs. 2, 5 and 6, whereby the respective pairs of fingers may be compressed during passage through the openings 11ᵃ of the respective flared portions 11—11 so as to resiliently engage material of the flared portions adjacent the openings for temporarily securing the soldering lugs to the trimmer condenser. It will be noticed that a circular opening 18ᵃ (Figs. 3 and 5) is provided, in my preferred form, between the legs 18—18 and adjacent the junction of the legs with the portion 17 whereby a lead wire may be passed therethrough and soldered to the lug. At the other end of the flat portion 13 from that end from which the angular bend portion 17 extends, I have provided a wire-receiving portion 19 which, in my preferred form, has wire-receiving openings in the form of notches 20—20 in the outer edges thereof and an aperture 21 formed entirely within the material thereof, as most clearly shown in Figs. 2 and 6.

In assembling the parts of the installation shown in Figs. 1 and 2, I preferably secure a soldering lug to each of the opposite ends of the tuning coil 1 by extending the respective rivets 14 of the soldering lugs through openings 22 (Fig. 1) in the cardboard form 4 of the coil form and heading the rivet over upon the inside of the coil, as most clearly shown in Fig. 1. After the soldering lugs have been affixed to the coil form, the right-angular bend portion 17 and the wire-receiving portion 19 of the respective lugs extend downwardly beneath the tuning coil in substantially parallel relation. An end of the lead wire 15 extending from the coil 16 may then be passed into the coil form through an opening 23 in the form 4 of the coil and then passed outwardly through the tubular rivet 14 and soldered to the wire-receiving portion 19, as shown in Fig. 1. Next, the coil form, with soldering lugs attached, is moved toward the terminal condenser 2 and the pairs of yieldable portions 18—18 of respective soldering lugs moved into openings 11ᵃ of respective flared portions 11—11 of the trimmer condenser. During passage of the pairs of yieldable portions 18—18 through the openings of the flared portions 11, the yieldable portions 18 of each pair will be contracted due to the fact that the distance between outermost edges of the same is greater than the widest diameter of the openings of the flared portions. Thus the soldering lugs are temporarily secured to the flared portions 11—11 and a fixed lead 24, as shown in Fig. 1, may also be passed through the opening 11ᵃ of the flared portion. Finally, the solder 12 is applied to the flared portion 11 so as to secure the lead 24 to the flared portion and at the same time permanently affix the soldering lug to the terminal condenser. Although I have shown solder applied to one only of the flared portions 11 in Fig. 1 of the drawings, the omission of solder from the other flared portion is only for illustrative purposes and it should be understood that it may be applied to this flared portion as well. Thus the yieldable means 18—18 provided by my fixed form of soldering lug effects a substantial improvement in assembly methods in radio manufacture due to the fact that it enables the tuning coil to be affixed to a support, such as a terminal condenser, until such time as a lead wire may be secured to the condenser and the lead wire and the tuning coil permanently secured to the condenser through soldering, as hereinabove described.

Figure 3:
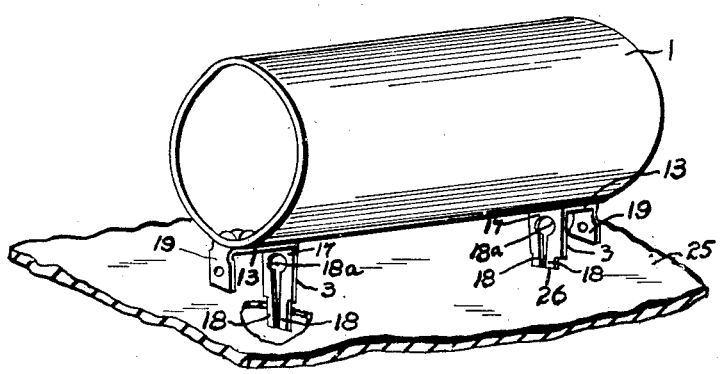
Fig. 3 is a perspective view showing the use of my first form of improved soldering lugs for securing a coil form to an insulating plate.
Figure 4:
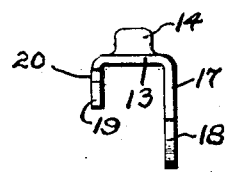
Fig. 4 is a side view of my first form of soldering lug per se.

In Fig. 3 I have shown another use of my first form of soldering lug which may be to secure a coil form 1 to a supporting part in the form of a plate 25 of insulating material. It will be noticed that in this use of my invention the coil form is so disposed relative to the plate 25 that its major axis is in substantially parallel relation to the plate. In this form of my invention the soldering lug 3 is secured to opposite ends of the coil form 1 in substantially the manner in which the soldering lugs are secured to the coil form shown in Figs. 1 and 2 of my invention, and the yieldable fingers 18—18 of the lugs in my second use extend through apertures 26 of the insulating plate so as to resiliently engage the material adjacent the apertures for temporarily securing the coil form to the plate. The soldering lugs may be permanently secured to the plate 25 through means of solder (not shown) applied to those portions of the yieldable fingers 18—18 disposed on the other side of the plate 25 from that from which the coil form 1 is disposed. Although I have not shown any wire leads in the installation shown in Fig. 3, it is apparent that a wire, or group of wires, may be soldered to the yieldable fingers 18—18 or other wire-receiving portions 19 of the respective soldering lugs substantially in the manner illustrated and described in connection with the installation shown in Fig. 1 of the drawings. Thus my improved soldering lugs serve to hold the coil form 1 in position until lead wires may be soldered to the lugs and the lugs permanently secured in place through applying solder to the yieldable fingers 18—18 of the same, as hereinabove described.

The installation shown in Figs. 7 and 8 comprises a tuning coil 25 secured to a trimmer condenser 2 (which is similar in form to the condenser 2 of the installation shown in Figs. 1 and 2) by means of my second form of soldering lug 26. It will be noticed that whereas the coil form 1 of the installation shown in Figs. 1 and 2 is disposed relative to the trimmer condenser with its major axis in parallel relation to the plane of the outwardly-flared portions 11—11, the coil form 25 of the installation shown in Figs. 7 and 8 is disposed with its major axis in substantially perpendicular relation to the plane of the portions 11—11. In the installation of Figs. 7 and 8 the soldering lugs 26 are preferably secured to opposite sides of the coil form 25 adjacent an end thereof and have yieldable attaching means extending beneath one end of the coil form through apertures 11ᵃ of the outwardly-flared portions 11—11 of the trimmer condenser in the manner in which the yieldable attaching means of the soldering lugs 3 of the installation shown in Figs. 1 and 2 are secured to the condenser.

Referring in detail to my second form of soldering lug 26, I have shown a lug made of one piece of sheet metal having a flat portion 28 and a tubular rivet 29 extending from the flat portion for securing the lug to the coil form 25. Integral with one end of the flat portion 28, I have provided an attaching portion 30 extending away from the flat portion in substantially angular relation thereto and then downwardly in substantially parallel relation to the plane of the flat portion. The free end of the attaching portion 30 is bifurcated to provide a pair of yieldable fingers 31—31 which are similar in form to the pair of fingers 8—8 of my first form of soldering lug. The pairs of fingers are adapted to extend through openings 11ª of the outwardly-flared portions 11—11 and resiliently engage material of the flared portions adjacent the openings so as to temporarily secure the tuning coil to the condenser in the manner of the soldering lugs of the installation shown in Figs. 1 and 2. At the other end of the flat portion 28 from that with which the attaching means 30 is integral, I have provided a wire-receiving portion 31 having openings 31ª which are adapted to receive ends 32 of the wiring coil 33 whereby the ends 32 may be soldered, as at 34, to the wire-receiving portions 31. Thus my modified form of soldering lug may be advantageously used in the manner of my first form of lug for temporarily securing a unit to a support prior to permanent attachment of the unit thereto through soldering.

In Figs. 9 and 10 I have shown an installation comprising a coil form 25 temporarily secured to a support, such as a flat insulating plate 35, by means of my third form of soldering lug 36. It will be noticed that my soldering lugs 36 are secured to opposite sides of the coil form 25 adjacent one end thereof and adapted to extend through apertures 37 in the support 35 for temporarily securing the form to the panel until such time as solder, shown at 38 in Fig. 10, may be applied to those portions of the lug extending beneath the support 35 for permanently securing the unit to the panel. My third form of soldering lug, as most clearly illustrated in Figs. 11 and 12, comprises a substantially flat portion 39 having a rivet 40 pressed therefrom and an angularly-bent wire-receiving portion 41 at one end thereof. An opposite end of the flat portion 39 from that from which the wire-receiving portion 41 extends is bifurcated, in my preferred form, to form a pair of yieldable fingers 42—42 which are shaped in the manner of the yieldable fingers 18—18 of my first form of invention (Figs. 1 and 2) or the yieldable fingers 31—31 of my second form of invention (Figs. 7 and 8) so as to be compressed during passage through an aperture 37 of the support thereby to resiliently engage material of the support adjacent the aperture for temporary assembly of the soldering lugs with the support.

Thus by my invention I have provided soldering lugs of simple construction which serve not only to temporarily secure a unit to a support whereby assembly of the apparatus with which they are employed is greatly quickened, but also to provide means at both ends for receiving suitable lead wires which are to be permanently secured thereto.

Although I have illustrated and described preferred forms of my invention, I do not wish to be limited thereby because the scope of my invention is best defined by the following claims.

I claim:

1. An installation comprising an apertured supporting structure, a coil form in attachment with said supporting structure and a one-piece bracket secured to said coil form, said bracket having a flat portion, a tubular rivet extending from said flat portion and engaging said coil form to secure it to said bracket, a wire-receiving portion at one end extending in angular relation to said flat portion whereby a wire may be secured thereto, and a yieldable fastener portion at an opposite end of said flat portion from said wire-receiving portion, said fastener portion having a pair of yieldable legs engaging said supporting structure through said aperture whereby said coil form is secured to said support.

2. An installation of the class described comprising an apertured supporting structure, a bracket in attachment with said supporting structure and a soldering lug formed as a part of said bracket, a yieldable fastener portion formed as a part of said bracket and engaging said supporting structure through said aperture whereby said article is attached to said support, a part secured directly to and supported by said bracket, and a gob of solder on said yieldable fastener portion overcoming the yielding thereof to lock said bracket to said supporting structure.

3. A combination soldering lug and supporting bracket comprising an attaching portion having means for securing said device to a suitable part to be supported, a fastener portion integrally joined to one end of said attaching portion, said fastener portion having contractible and expansible means at its free end for spring engagement with walls surrounding an opening of said support through which said fastener portion extends, and a wire-receiving lug portion.

4. An installation of the class described comprising an apertured supporting structure, a bracket in attachment with said supporting structure and a soldering lug formed as a part of said bracket, an integral fastener portion at one end of said bracket, said fastener portion having contractible and expansible means at its free end for spring engagement with walls surrounding an opening of said support through which said fastener portion extends, and a wire-receiving lug portion.

ESSON J. POOL.